US009476383B2

(12) United States Patent
Caruel

(10) Patent No.: US 9,476,383 B2
(45) Date of Patent: Oct. 25, 2016

(54) AIRCRAFT TURBOJET ENGINE THRUST REVERSER WITH A REDUCED NUMBER OF LATCHES

(71) Applicant: AIRCELLE, Gonfreville L'Orcher (FR)

(72) Inventor: Pierre Caruel, Le Havre (FR)

(73) Assignee: AIRCELLE, Gonfreville l'Orcher ( * ) Notice: Subject to any disclaimer, the term of this patent is extended or adjusted under 35 U.S.C. 154(b) by 426 days.

(21) Appl. No.: 13/944,187

(22) Filed: Jul. 17, 2013

(65) Prior Publication Data

US 2014/0131515 A1 May 15, 2014

Related U.S. Application Data

(63) Continuation of application No. PCT/FR2012/050090, filed on Jan. 13, 2012.

(30) Foreign Application Priority Data

Jan. 17, 2011 (FR) ..................................... 11 50342

(51) Int. Cl.

| | |
|---|---|
| ***F02K 1/54*** | (2006.01) |
| ***B64D 33/04*** | (2006.01) |
| ***F02K 1/72*** | (2006.01) |
| ***F02K 1/76*** | (2006.01) |

(52) U.S. Cl.

CPC ................ *F02K 1/54* (2013.01); *B64D 33/04* (2013.01); *F02K 1/72* (2013.01); *F02K 1/766* (2013.01); *Y02T 50/671* (2013.01)

(58) Field of Classification Search

CPC ........... F02K 1/766; F02K 1/70; F02K 1/72; F02K 1/68; B64D 33/04

USPC ............... 244/110 B; 60/226.2; 239/265.29, 239/265.31

See application file for complete search history.

(56) References Cited

U.S. PATENT DOCUMENTS 4,437,783 A * 3/1984 Halin ....................... F02K 1/15 239/265.27
5,257,840 A * 11/1993 Rouzaud .................. E05C 3/24 292/201
5,547,130 A * 8/1996 Davies .................... F02K 1/766 23/265.29
5,720,449 A * 2/1998 Laboure ................. F02K 1/766 239/265.23
5,735,557 A * 4/1998 Harvey ................... F02K 1/766 239/265.29
6,021,636 A * 2/2000 Johnson ............. E05B 47/0603 244/110 B
6,045,091 A * 4/2000 Baudu ..................... F02K 1/766 239/265.25
6,145,786 A * 11/2000 Baudu ..................... F02K 1/766 244/110 B
6,148,607 A * 11/2000 Baudu ..................... F02K 1/766 239/265.17

(Continued)

FOREIGN PATENT DOCUMENTS

| | | | |
|---|---|---|---|
| EP | 1298309 | A1 | 4/2003 |
| FR | 2916426 | A1 | 11/2008 |
| RU | 2405719 | | 10/2009 |

*Primary Examiner* — Justin Rephann
(74) *Attorney, Agent, or Firm* — Burris Law, PLLC

(57) ABSTRACT

A thrust reverser with grids includes a jet engine pylon, a one piece cowl either directly or indirectly slidably mounted on the jet engine pylon between a direct jet position and a reverse jet position, and a system for locking this cowl on a beam. The system has a single tertiary lock, which is positioned on one side of the jet engine pylon being capable of locking a corresponding upper edge of the cowl. In addition, the tertiary lock includes a locker to lock the cowl, a blocker for blocking the locker, and a position detector in order to detect the position of the locker. The system further includes another detector to detect proper closing of the other upper edge of the cowl.

5 Claims, 6 Drawing Sheets

9a
9b
33
37
35
23
19
39
49
55
21
45
51
53
11
17
47

(56) References Cited

U.S. PATENT DOCUMENTS 6,216,980 B1 * 4/2001 Baudu ........................ F02K 1/76 244/110 B
6,604,355 B1 * 8/2003 Sternberger ............ F02K 1/766 239/265.29
6,625,972 B1 * 9/2003 Sternberger .............. F02K 1/76 239/265.29
7,146,796 B2 * 12/2006 Lair .................... E05B 47/0607 239/265.25
7,698,885 B2 * 4/2010 Beutin .................... F02K 1/766 60/226.2
8,528,950 B2 * 9/2013 Organek ............... E05B 17/007 292/216
8,919,668 B2 * 12/2014 Vauchel .................... F02K 1/09 239/265.11
9,109,536 B2 * 8/2015 Willett .................... F02K 1/766
2002/0145078 A1 * 10/2002 Rouyer ................... F02K 1/766 244/110 B
2008/0098720 A1 * 5/2008 Watson ..................... F02K 1/56 60/226.2
2010/0264676 A1 * 10/2010 Sternberger ............ B64C 13/00 292/302
2014/0245716 A1 * 9/2014 Gonidec ................... F02K 1/70 60/226.2

* cited by examiner

AIRCRAFT TURBOJET ENGINE THRUST REVERSER WITH A REDUCED NUMBER OF LATCHES

CROSS-REFERENCE TO RELATED APPLICATIONS

This application is a continuation of International Application No. PCT/FR2012/050090, filed on Jan. 13, 2012, which claims the benefit of FR 11/50342, filed on Jan. 17, 2011. The disclosures of the above applications are incorporated herein by reference.

FIELD

The present disclosure relates to a thrust reverser for an aircraft turbojet engine, with a reduced number of latches.

BACKGROUND

The statements in this section merely provide background information related to the present disclosure and may not constitute prior art.

An aircraft is driven by several turbojet engines each accommodated in a nacelle used for channeling the air flows generated by the turbojet engine, which also harbors a set of devices ensuring various functions when the turbojet engine is operating or at a standstill.

These devices may notably comprise thrust reversal means.

A nacelle generally has a tubular structure, comprising an air intake upstream from the turbojet engine, a middle section intended to surround a fan of the turbojet engine, a downstream section harboring thrust reversal means and intended to surround the combustion chamber of the turbojet engine and generally ends with an ejection nozzle, the outlet of which is located downstream from the turbojet engine.

Modern nacelles are intended to harbor a dual flux turbojet engine capable of generating via blades of the fan an air flow, a portion of which, called a hot or primary flow, circulates in the combustion chamber of the turbojet engine, and the other portion of which, called a cold or secondary flow, circulates outside the turbojet engine through a ring-shaped passage also called a vein, formed between a fairing of the turbojet engine and an internal wall of the nacelle. Both air flows are ejected from the turbojet engine through the rear of the nacelle.

The role of a thrust reverser is, during the landing of an airplane, of improving the braking capability of the latter by redirecting forwards at least one portion of the air of the secondary flow. In this phase, the reverser obstructs the vein of the cold flow and directs the latter towards the front of the nacelle, thereby generating a counter thrust which will be added to the braking of the wheels of the airplane.

The means applied for achieving this reorientation of the cold flow vary according to the type of reverser. However, the structure of a reverser comprises mobile cowls which may be displaced between a closed position or in a "direct jet" in which they close this passage and an open position or "reverse jet" in which they open in the nacelle a passage intended for the deflected flow. These cowls may fulfill a deflection function or simply an activation of other deflection means.

In the case of a thrust reverser with grids, the reorientation of the air flow is carried out by deflection grids, the cowl only having a simple sliding function aiming at exposing or covering these grids.

The translation of the mobile cowl is carried out along a longitudinal axis substantially parallel to the axis of the nacelle. Thrust reversal flaps actuated by the sliding of the cowl, allow obstruction of the cold flow vein downstream from the deflection grids, so as to optimize the reorientation of the cold flow towards the outside of the nacelle.

From the prior art, and notably from document FR 2 916 426, a thrust reverser with grids is known, the mobile cowl of which is a one-piece cowl and slidably mounted on sliders positioned on either side of the suspension pylon of the assembly formed by the turbojet engine and its nacelle.

The term "one-piece cowl" is meant a cowl with a quasi-annular shape, extending from one side to the other of the pylon without any interruption.

Such a cowl is often designated by the terms of "O-duct" with reference to the shape of a ferrule of such a cowl, as opposed to the "D duct", which in fact comprises two half-cowls each extending over a half circumference of the nacelle.

The sliding of a cowl of the "O-duct" type between its direct jet and reverse jet positions is conventionally ensured by a plurality of actuators, of the mechano electric type (i.e., a worm screw actuated by an electric motor and displacing a nut) or of the hydraulic type (i.e., actuators actuated by pressurized oil).

In order to avoid untimely sliding of such a cowl of the "O-duct" type, which may have disastrous consequences, notably in a flight phase, several redundant locking systems are provided.

Conventionally, two systems for locking the actual actuators and a locking system, a so-called tertiary system, allowing direct locking of the sliding cowl to the supporting beam of the nacelle, currently called a "12 o'clock beam" because of its upper position relative to the circle defined by the section of the nacelle or of the jet engine pylon, are provided.

Such a tertiary locking system typically comprises two tertiary locks, positioned on either side of the 12 o'clock beam or of the jet engine pylon, each tertiary lock comprising means for locking the sliding cowl, means for blocking these locking means and means for detecting the position of said locking means. Such a lock position on one side of the 12 o'clock beam or of the jet engine pylon is generally insufficient for ensuring retention of the mobile cowl because of its flexibility.

By detecting the position of the locking means, it is possible to check that the upper edge of the sliding cowl corresponding to the relevant tertiary block is properly closed (upstream sliding position, also called "direct jet" position).

Thus, each tertiary lock fulfills a function of locking the sliding cowl on the one hand, and a function for detecting the proper closing of the corresponding edge of this cowl on the other hand.

SUMMARY

The present disclosure simplifies these tertiary locking means, both for reducing the costs and for reducing the weight of the nacelle.

The present disclosure provides a thrust reverser with grids comprising a jet engine pylon, a one piece cowl, directly or indirectly slidably mounted, on this jet engine pylon between a "direct jet" position and a "reverse jet" position, and a system for locking this cowl on this beam, this system comprising:

a single tertiary lock, positioned on one side of said beam or of the jet engine pylon, capable of locking the corresponding upper edge of said cowl, this tertiary lock comprising means for locking the sliding cowl, means for blocking these locking means and means for detecting the position of these locking means; and means for detecting proper closing of the other upper edge of said cowl.

By directly or indirectly, it should be specified that the sliding cowl may notably be slidably mounted along the pylon via the beam, notably the 12 o'clock beam, supporting guiding rails.

Thus, in the locking system according to the present disclosure, a single tertiary lock is used, which is in reality sufficient for ensuring the tertiary locking of the assembly of the sliding cowl taking into account the one piece nature of the latter.

As for the function for detecting proper closing of the two upper edges of the cowl, ensured in the prior art by each of the means for detecting the position of the blocking means of both tertiary locks, it is presently ensured by the means for detecting the position of the blocking means of the single tertiary lock cooperating with one of the upper edges of the sliding cowl on the one hand, and by the means for detecting the proper closing of the other upper edge of the sliding cowl on the other hand.

By thus replacing one of the tertiary locks with simple means for detecting proper closing of one of the two upper edges of the sliding cowl, the tertiary locking system is considerably simplified and lightened. Inappropriate closing of the opposite side may be generated by a mechanical failure of one of the other means for retaining the mobile cowl, its detection thus allows detection of the failure of one of the other retention means, and thus an improvement in their availability.

According to other optional features of the present disclosure:

- said single tertiary lock is of the type comprising a hook pivotally mounted on said 12 o'clock beam, between a position for locking a bolt secured to said cowl, and a position for unlocking this bolt,
- said blocking means comprise a latch pivotally mounted on said 12 o'clock beam between a blocking position in which they maintain said hook in its locking position, and an unblocking position, in which they allow the passage of said hook from its locking position to its unlocking position,
- said blocking system comprises an actuator for having said latch pass from the blocking position to its unblocking position, and a spring for returning said latch to its blocking position,
- said position detection means comprise a detector of the position of said latch,
- said means for detecting proper closing of the other upper edge of said cowl comprise:
- a groove formed by the area of said upper other edge, this groove extending away from said beam towards the downstream area of said cowl and having in its upstream portion a widened area,
- a connecting rod slidably mounted on said 12 o'clock beam, one first end of which is guided in said groove, and the other end of which comprises a finger capable of penetrating into a first notch formed by said latch, so as to maintain this latch in the unblocking position, and
- elastic means, returning said connecting rod towards said latch,
- said latch further comprises a second notch capable of receiving said finger, so as to maintain said latch in the blocking position.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
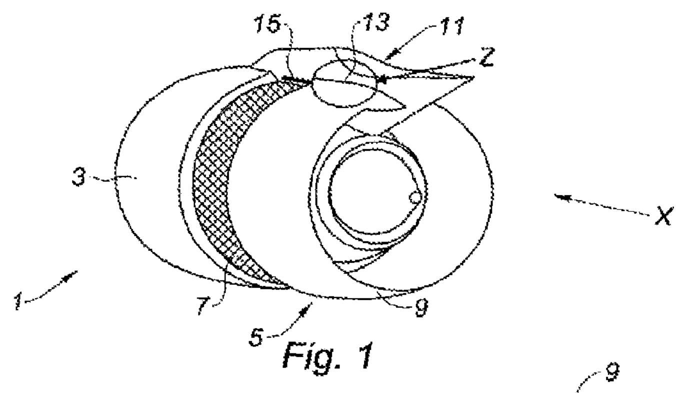
FIG. 1 illustrates, in a perspective view, a nacelle for an aircraft engine, equipped with a thrust reverser with a one piece sliding cowl.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference is now made to FIG. 1, in which a nacelle 1 for an aircraft turbojet engine is illustrated schematically.

This nacelle in its upstream portion includes a cowling 3 defining the air intake of the nacelle on the one hand and surrounding the fan of the turbojet engine on the other hand.

Downstream from this cowling 3 is found a thrust reverser structure with grids 5, notably comprising thrust reversal grids 7, a sliding cowl 9 and the jet engine pylon 11.

The cowl 9 is slidably mounted on the jet engine pylon 11 between the position visible in FIG. 1, a so-called "reverse jet" position, and an upstream position, a so called "direct jet" position.

The "reverse jet" position gives the possibility of sending back towards the upstream area of the nacelle, through the grid 7, a portion of the cold air flow circulating inside the nacelle, and thereby contributing to braking the aircraft upon landing.

In the "direct jet" position, the grids 7 are covered by the cowl 9, so that the whole of the cold air circulating inside the nacelle is ejected downstream from this nacelle, and corresponds to the cruising and take-off situations of the aircraft.

In the present case, the sliding cowl 9 has a one piece structure, i.e. it is formed by a single assembly which is substantially annular, the upper edges 13 of which are slidably mounted on respective rails 15, positioned on either side of the jet engine pylon 11.

A tertiary lock positioned in the area Z of FIG. 1 is provided, allowing the locking of the sliding of the mobile cowl 9 relative to the jet engine pylon 11, outside the phases where the thrust reversal function has to be applied.

The operating mode of such a lock will now be briefly recalled in FIGS. 2 to 10.

On the whole of these figures, the sliding cowl 9 will be symbolically illustrated in dotted lines.

Figure 2:
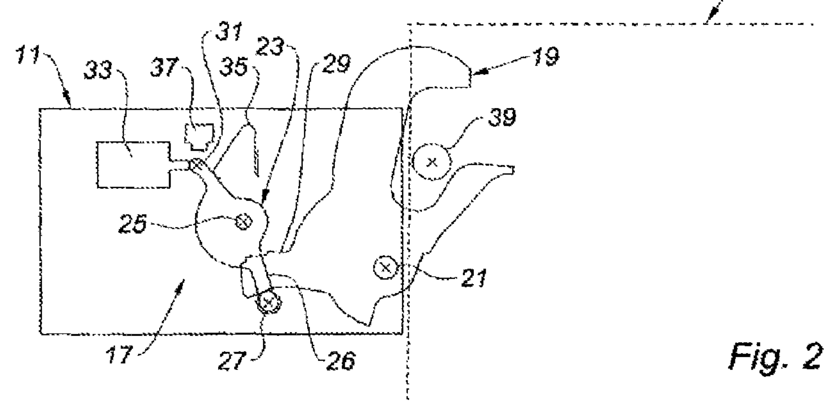
FIGS. 2 to 10 illustrate the operation of a tertiary lock of the prior art, located in the area Z of FIG. 1.

With reference to FIG. 2, it may be seen that the tertiary lock 17 of the prior art comprises a hook 19, pivotally mounted around an axis 21 secured to the jet engine pylon 11.

A blocking latch 23 is itself pivotally mounted around an axis 25 on the jet engine pylon 11.

This blocking latch 23 includes a tail 26 which ends with a roller 27, this tail may itself cooperate with a tail 29 of the hook 19, so as to prevent rotation of the latter.

This latch 23 further includes a head 31 which may be pushed by an actuator 33 such as a solenoid.

A spring 35 pushes the head 31 towards the actuator 33, i.e. in order to pivot the latch 23 in the anti-clockwise direction.

Figure 4:
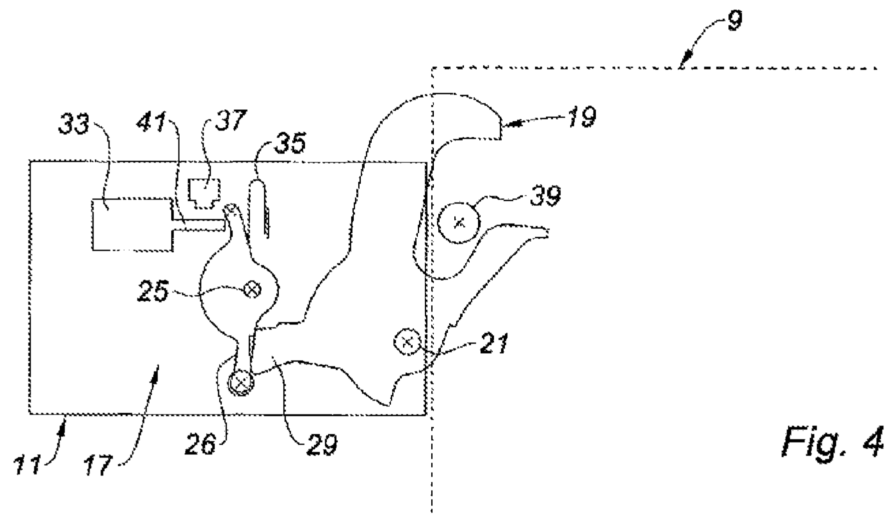
Figure 5:
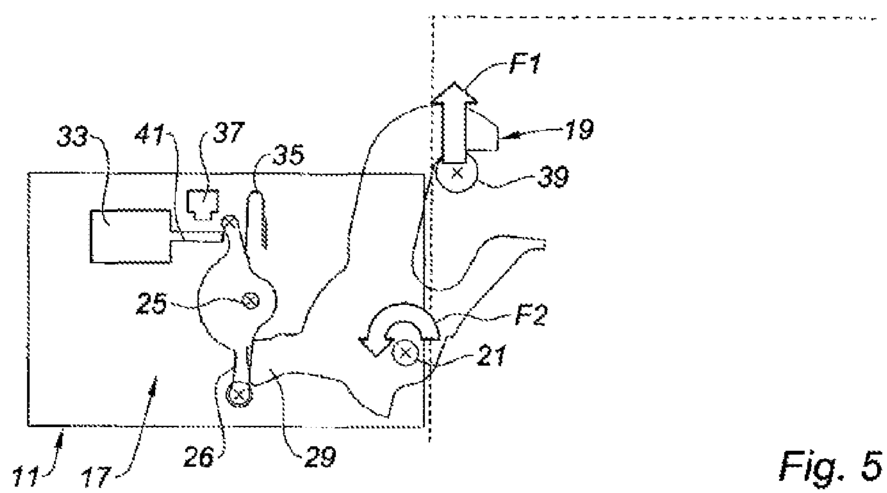
Figure 6:
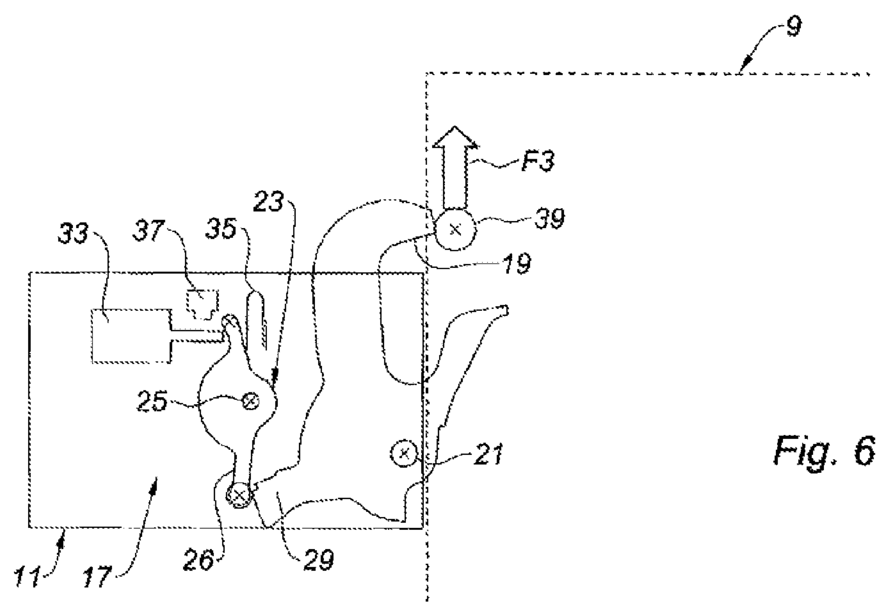

Detection means 37, such as a magnetic or optical detector, allows detection of the presence of the head 31 of the latch 23, and thus discrimination of the position of this latch visible in FIG. 2 relatively to the position of this latch for example visible in FIGS. 4 and 5.

Finally it should be noted that the hook 19 cooperates with a bolt 39 secured to the sliding cowl 9.

The operating mode of the tertiary lock which has just been described is the following.

When the thrust reverser 5 is in the "direct jet" (take-off and cruising) position, the tertiary lock 17 is in the position illustrated in FIG. 2.

In this position, the hook 19 blocks translation of the bolt 39 towards the top of the figure, corresponding to a translation towards the upstream area of the sliding cowl 9.

It should however be noted that if slight play is allowed in the relative movements of the bolt 39 and of the hook 19, in order to take into account the tolerances of various parts, as well as the small normal displacements of these parts relatively to each other.

Figure 3:
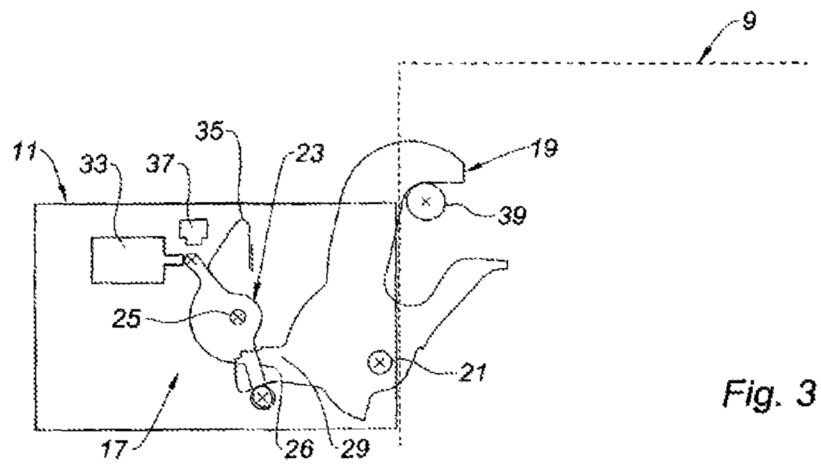

When the hook 19 is in the locked position, the bolt 39 may thus move as far as the extreme downstream position visible in FIG. 3.

It should be noted that in FIG. 2 like in FIG. 3, the tail 26 of the latch 23 is engaged on that 29 of the hook 19, thereby preventing any rotation of this hook.

When it is desired to proceed with the opening of the sliding cowl 9, i.e. therefore causing it to slide towards the downstream area of the nacelle, i.e. further towards the top of the figures appended herein, one starts by acting on the actuator 33 in order to cause extension of this actuating finger 41.

This finger 41 acting on the head 31 of the latch 23, has the effect of pivoting the latter in the clockwise direction, and thus releasing the tail 29 of the hook 19, as this is visible in FIG. 4.

It is then possible to act on the actuators which allow sliding of the cowl 9 downstream from the nacelle, so that the bolt 39 will abut on the hook 19 as this is visible in FIG. 5 and indicated by the arrow F1.

Under the effect of this abutment, the hook 19 pivots in the anticlockwise direction, as this is indicated by the arrow F2.

Because of this pivoting, the bolt 39 escapes from the hook 19 as this is indicated by the arrow F3.

Figure 7:
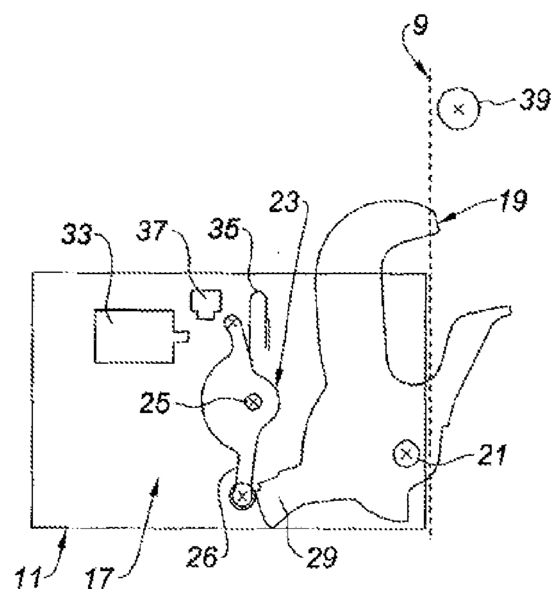
Figure 8:
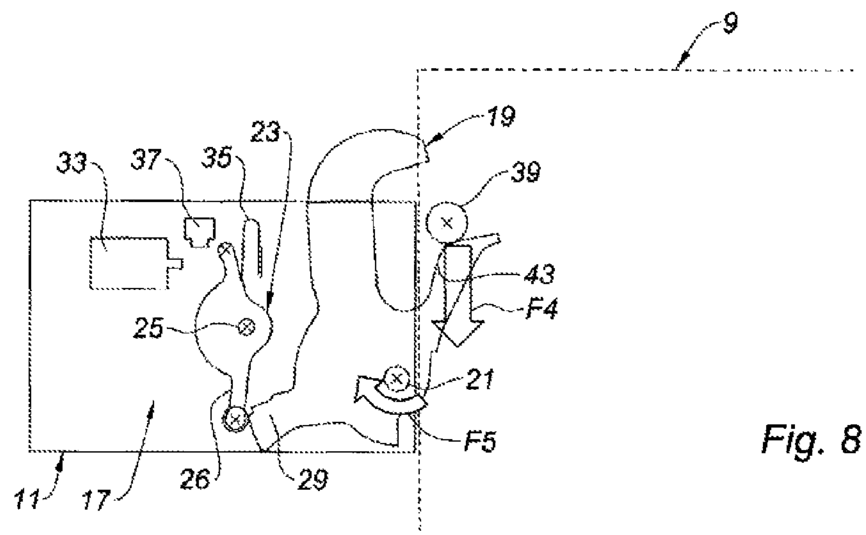

Once complete sliding of the cowl 9 has been carried out towards the downstream area, the configuration of FIG. 7 is attained, wherein the bolt 39 is moved away downstream from the hook 19.

It should be noted that during the phases 6 and 7, the end of the tail 26 of the latch 23 prevents pivoting of the hook 19 in the clockwise direction.

When it is desired to close the sliding cowl 9, so as to reposition the thrust reverser 5 in its "direct jet" position, the actuators for actuating this sliding cowl are retracted, which has the effect of bringing back the bolt 39 into contact with a rounded portion 43 of the hook 19, as this is indicated by the arrow F4.

Under the effect of this contact, the hook 19 is driven into clockwise rotation, as this is indicated by the arrow F5.

Figure 9:
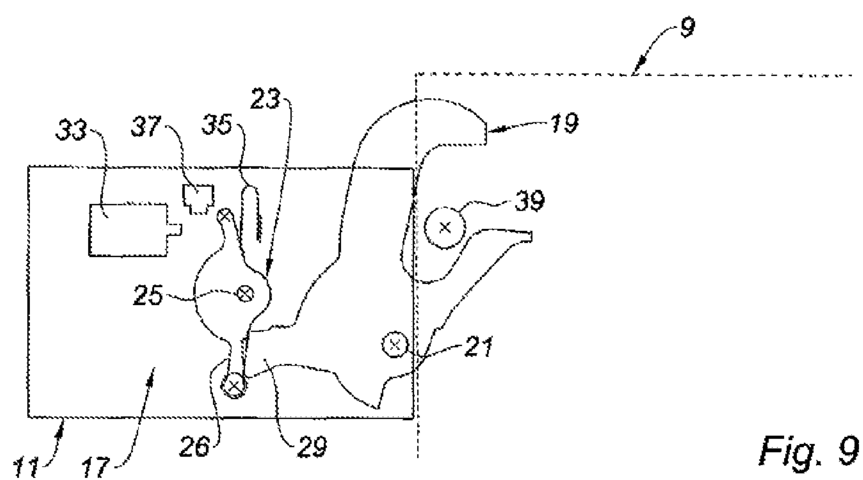

The tail 29 of the latch 23 may then escape from that 29 of the hook 19 and this hook may thus return to its initial position, as this is indicated in FIG. 9.

Figure 10:
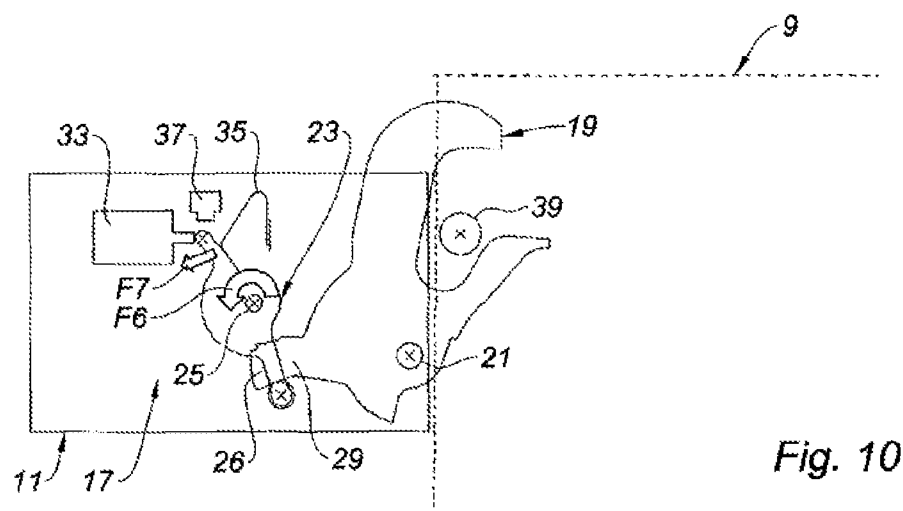

Under the effect of the spring 35, the latch 23 then pivots in the clockwise direction F6, as this is indicated in FIG. 10, and the head 31 of this latch 23 returns to being in front of the detector 37 facing it by pushing the actuation finger 41 inside the body of the actuator 33, as this is indicated by the arrow F7.

It is therefore understood that the latch 23 has a function of locking the rotation of the hook 19 on the one hand and a function of checking the proper closing of the sliding cowl 9 on the other hand.

Indeed, as long as the head 31 of this latch 23 has not returned to being in front of the detector 37 facing it (configuration of FIG. 10), this means that the hook 19 has itself not returned to its closing position and therefore that the bolt 39 has not itself returned to its initial position corresponding to the "direct jet" position of the thrust reverser 5.

When it is desired to use a single tertiary lock 17 for the assembly of the sliding cowl 9, i.e. a tertiary lock positioned on only one of the sides of the jet engine pylon 11, it is understood that the function for locking the assembly of the sliding cowl 9 may be ensured, because of the one piece nature of this sliding cowl.

On the other hand, the function for detecting proper closings of the two upper edges of this sliding cowl cannot be fulfilled with a single tertiary lock of the type of the one which has just been described, corresponding to the prior art.

The present disclosure provides an enhancement to this tertiary lock, by providing means for detecting proper closing of the other upper edge of the sliding cowl, i.e. of the edge of this sliding cowl which does not cooperate with this tertiary lock.

Figure 11:
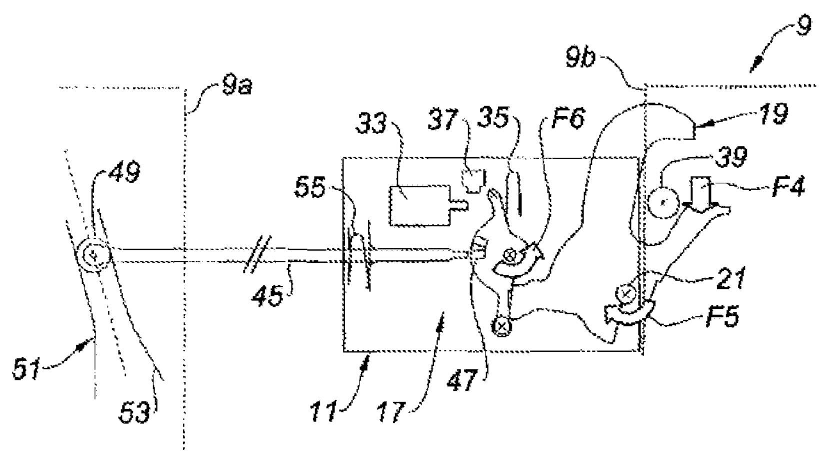
FIGS. 11 to 13 illustrate the different steps of the operation of a locking system according to the present disclosure.
Figure 12:
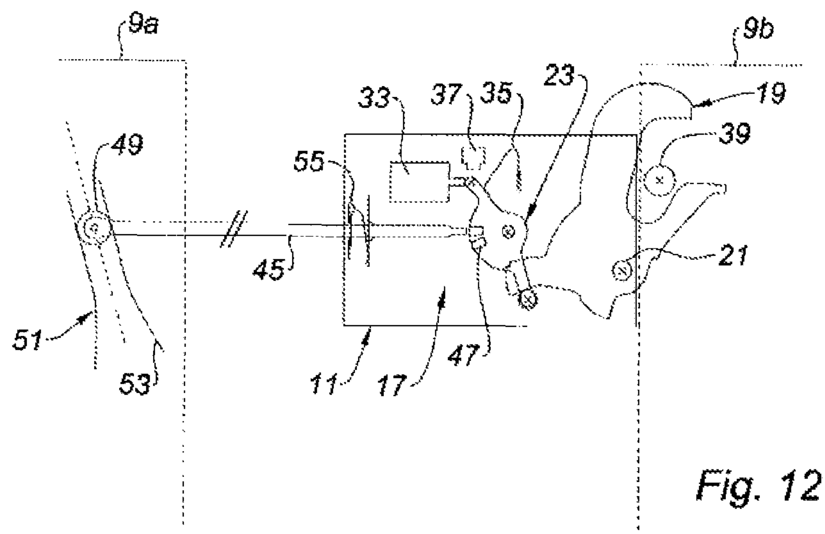
Figure 13:
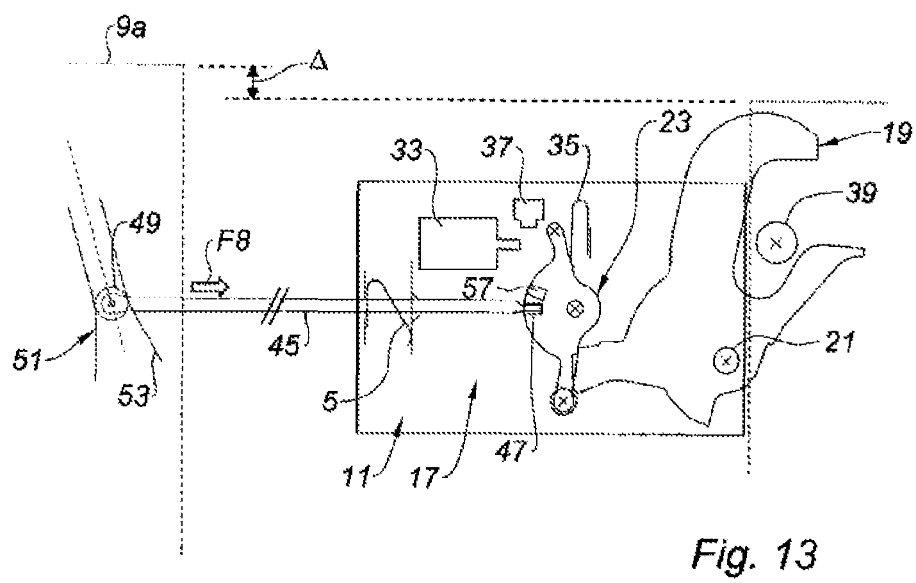

In order to understand the structure of the present disclosure and how it operates, reference will now be more particularly made to FIGS. 11 to 13.

In these figures, this sliding cowl 9 is also illustrated in dotted lines, but the two upper edges **9*a* and 9*b* of the sliding cowls may now be seen, respectively cooperating with the rails 15 positioned on either side of the 12 o'clock beam 11**.

Thus, by assuming that the nacelle 1 is seen from the rear along the longitudinal direction, i.e. as indicated by the arrow X (see FIG. 1), the edge **9*a* of the mobile cowl 9 is the right upper edge of this mobile cowl, and the edge 9*b* of this mobile cowl 9** is the left upper edge of this mobile cowl.

In addition to the whole of the parts which have been described earlier, it may be seen that the locking system according to the present disclosure comprises a connecting rod 45 slidably mounted transversely to the jet engine pylon 11 between a position visible in FIG. 11, in which it is moved away from a first notch 47 formed in the body of the latch 23, and the position visible in FIG. 13, in which this connecting rod penetrates the inside of this first notch 47, the latch 23 being in the unblocking position.

At its other end, the connecting rod 45 includes a rotary roller 49, guided by a groove 51 formed in the upper edge **9*a* of the sliding cowl 9, this groove extending away from the jet engine pylon 11 towards the downstream area of the thrust reverser, i.e. towards the top of the drawing sheet, as this is visible in FIGS. 11 to 13**.

On the other hand, in its upstream portion, this groove 51 includes a widened portion forming a funnel 53.

Elastic means 55, comprising one or several springs, elastically urge the connecting rod 45 towards the inside of the first notch 47.

The operating mode of this mechanism will now be described.

When the sliding cowl 9 returns to its closing position, as this indicated by the arrow F4, the hook 19 is brought back into its locking position, as this is indicated by the arrow F5.

If the edge 9*a* of the sliding cowl 9 actually closes at the same time as the edge 9*b* of this sliding cowl, the roller 49 is led upstream from the groove 51, which has the effect of moving the end of the connecting rod 45 away from the first notch 47 of the latch 23, against elastic means 55, as this is illustrated in FIG. 11.

Because of this separation, the latch 23 may freely pivot according to the arrow F6, and thus return to its bottom position, as this is indicated in FIG. 12, giving the possibility of achieving perfect immobilization of the sliding cowl 9 in the "direct jet" position.

The return of the latch 23 into its blocking position under the effect of the spring 35 is detected by the detector 37, thereby sending a piece of information on the proper closing of both edges 9*a* and 9*b* of the sliding cowl 9, to the central control unit.

If, on the other hand only the edge 9*b* is properly closed, but not the edge 9*a*, for example because of the failure of one of the actuators for actuating the sliding cowl 9, this upper edge 9*a* remains slightly retracted by a certain length Δ downstream from the upper edge 9*b*, as this is illustrated in FIG. 13.

Because of the tilt of the groove 51 relative to the axis of the nacelle, this groove exerts a force pushing the connecting rod 45 towards the first notch 47, against elastic means 55, as this is indicated by the arrow F8 of FIG. 13.

The connecting rod 45, thereby introduced into this first notch 47, has the effect of blocking the rotation of the latch 23, in spite of the return of the hook 19 to its locked position: the detector 37 may thus note that the head 31 of the latch 23 has not returned to its initial position, and send a piece of information on the lack of closure of the right upper edge 9*a* of the sliding cowl 9, to the computers usually processing this information.

It is therefore understood that the mechanism which has just been described gives the possibility, with a single tertiary lock and a single detector, of detecting a lack of closure of any of the two upper edges 9*a*, 9*b* of the sliding cowl 9.

Of course, the present disclosure is by no means limited to the described and illustrated forms.

Thus, it is also possible to also provide a second notch 57 formed in the latch 23, positioned so that the connecting rod 45 may prevent the rotation of the latch 23 from its blocked position illustrated in FIG. 12.

Such a second notch 57 in the case of failure of one of the actuators acting on the right half of the sliding cowl 9, gives the possibility of blocking any possible actuation of the assembly of this sliding cowl.

Indeed, the failure of one or several actuators for actuating the right half of the sliding cowl 9 has the effect of causing a displacement similar to the displacement Δ of FIG. 13 of this right half of the sliding cowl, which causes penetration of the connecting rod 45 into the inside of the second notch 57, and therefore blocking of the hook 19 in its locked position.

In this way, mechanical banning of any actuation of the sliding cowl 9 may be achieved when at least some of these actuators are faulty, in order to facilitate their detection.

What is claimed is:

1. A thrust reverser with grids comprising a jet engine pylon, a one piece cowl either directly or indirectly slideably mounted on the jet engine pylon between a direct jet position and a reverse jet position, and a system for locking the cowl on a beam, the cowl having two distinct upper edges, the system comprising:

- a single lock, positioned on one side of said jet engine pylon, on one upper edge of said two distinct upper edges of said cowl, said lock comprising locking means for locking the cowl, blocking means for blocking said locking means, wherein said blocking means comprises a latch pivotally mounted on said jet engine pylon between a blocking position in which said blocking means maintain a hook in a locking position, and an unblocking position, in which said blocking means allows said hook to pass from said locking position to an unlocking position, and position detection means for detecting the position of said locking means; and
- means for detecting proper closing of another upper edge of said two distinct upper edges cowl, wherein said means for detecting proper closing of said another upper edge of said cowl comprises:
  - a groove formed in an area of said another upper edge, said groove extending away from said jet engine pylon towards a downstream area of said cowl and having a widened area in an upstream portion of said cowl;
  - a connecting rod slideably mounted transversely on said beam or said jet engine pylon, one first end of which is guided in said groove and another end comprising a finger capable of penetrating into a first notch formed in said latch so as to maintain said latch in the unblocking position; and
  - elastic means urging back said connecting rod towards said latch.

2. The thrust reverser according to claim 1, wherein said lock comprises said hook pivotally mounted on said jet engine pylon, between a position for locking a bolt secured to said cowl, and a position for unlocking the bolt.

3. The thrust reverser according to claim 1, wherein said locking system comprises an actuator for having said latch pass from said blocking position to said unblocking position, and a spring for returning said latch to said blocking position.

4. The thrust reverser according to claim 1, wherein said position detection means comprise a detector for the position of said latch.

5. The thrust reverser according to claim 1, wherein said latch further comprises a second notch capable of receiving said finger, so as to maintain said latch in said blocking position.

* * * * *